(12) United States Patent
Boon et al.

(10) Patent No.: US 9,115,314 B2
(45) Date of Patent: Aug. 25, 2015

(54) PROCESS FOR CONVERTING A SOLID BIOMASS MATERIAL

(71) Applicant: SHELL OIL COMPANY, Houston, TX (US)

(72) Inventors: Andries Quirin Maria Boon, Amsterdam (NL); Johan Willem Gosselink, Amsterdam (NL); John William Harris, Amsterdam (NL); Andries Hendrik Janssen, Amsterdam (NL); Martin Jean Pierre Cornelis Nieskens, Amsterdam (NL); Easwar Santhosh Ranganathan, Houston, TX (US); Colin John Schaverien, Amsterdam (NL); Nicolaas Wilhelmus Joseph Way, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/868,455

(22) Filed: Apr. 23, 2013

(65) Prior Publication Data
US 2013/0276360 A1  Oct. 24, 2013

Related U.S. Application Data

(60) Provisional application No. 61/637,046, filed on Apr. 23, 2012.

(51) Int. Cl.
C10G 1/06 (2006.01)
B01J 8/32 (2006.01)
(Continued)

(52) U.S. Cl.
CPC . *C10G 1/065* (2013.01); *B01J 8/32* (2013.01); *B01J 8/388* (2013.01); *C10G 1/002* (2013.01);
(Continued)

(58) Field of Classification Search
CPC .......... C10G 1/065; C10G 1/002; C10G 1/08; C10G 3/42; C10G 3/57; C10G 11/18; C10G 69/04; B01J 8/32; B01J 8/388
USPC ............................................. 44/307; 585/240
See application file for complete search history.

(56) References Cited

U.S. PATENT DOCUMENTS 3,502,574 A  3/1970 Baillie
4,435,279 A  3/1984 Busch et al.
(Continued)

FOREIGN PATENT DOCUMENTS

CN  1270984  10/2000
CN  101558135  10/2009
(Continued)

OTHER PUBLICATIONS

Schoenmakers, P.J., et al.; "Comparison of comprehensive two-dimensional gas chromatography and gas chromatography-mass spectrometry for characterization of complex hydrocarbon mixtures"; Journal of Chromatography A, 892 pp. 29-46; 2000.
(Continued)

*Primary Examiner* — Cephia D Toomer

(57) ABSTRACT

A process for converting a solid biomass material, comprising contacting the solid biomass material and a hydrocarbon co-feed with a catalytic cracking catalyst at a temperature of more than 400° C. in a riser reactor to produce one or more cracked products, wherein the solid biomass material is introduced to the riser reactor at a location downstream of the location where the hydrocarbon co-feed is introduced to the riser reactor.

21 Claims, 3 Drawing Sheets

(51) Int. Cl.

| | |
|---|---|
| *C10G 69/04* | (2006.01) |
| *C10G 1/00* | (2006.01) |
| *C10G 1/08* | (2006.01) |
| *C10G 3/00* | (2006.01) |
| *C10G 11/18* | (2006.01) |
| *B01J 8/38* | (2006.01) |

(52) U.S. Cl.
CPC .. *C10G 1/08* (2013.01); *C10G 3/42* (2013.01); *C10G 3/57* (2013.01); *C10G 11/18* (2013.01); *C10G 69/04* (2013.01); *C10G 2300/1011* (2013.01)

(56) References Cited

U.S. PATENT DOCUMENTS

| | | | |
|---|---|---|---|
| 4,851,109 | A | 7/1989 | Chen et al. |
| 4,876,108 | A | 10/1989 | Underwood et al. |
| 5,580,442 | A | 12/1996 | Kwon et al. |
| 6,652,815 | B1 | 11/2003 | Sattar |
| 7,369,294 | B2 | 5/2008 | Gally et al. |
| 8,003,835 | B2 | 8/2011 | Yanik et al. |
| 8,013,195 | B2 | 9/2011 | McCall et al. |
| 8,063,258 | B2 | 11/2011 | Bartek et al. |
| 8,207,385 | B2 | 6/2012 | O'Connor et al. |
| 8,288,599 | B2 * | 10/2012 | Yanik et al. ............. 585/240 |
| 8,288,600 | B2 | 10/2012 | Bartek et al. |
| 8,455,705 | B2 | 6/2013 | Cortright et al. |
| 8,524,960 | B2 | 9/2013 | O'Connor et al. |
| 8,748,680 | B2 | 6/2014 | Hogendoorn et al. |
| 2008/0022595 | A1 | 1/2008 | Lemaire et al. |
| 2008/0035526 | A1 | 2/2008 | Hedrick et al. |
| 2008/0216655 | A1 | 9/2008 | Vimalchand et al. |
| 2009/0013603 | A1 | 1/2009 | Rolland |
| 2009/0026112 | A1 | 1/2009 | Dierickx et al. |
| 2009/0253948 | A1 | 10/2009 | McCall et al. |
| 2010/0105970 | A1 | 4/2010 | Yanik et al. |
| 2010/0135734 | A1 | 6/2010 | Bryan, Jr. |
| 2010/0163455 | A1 | 7/2010 | Hadjigeorge et al. |
| 2010/0222620 | A1 | 9/2010 | O'Connor et al. |
| 2011/0138681 | A1 | 6/2011 | Ramirez Corredores et al. |
| 2011/0154720 | A1 | 6/2011 | Bartek et al. |
| 2011/0224471 | A1 | 9/2011 | Wormsbecher et al. |
| 2012/0022307 | A1 | 1/2012 | Yanik et al. |
| 2012/0160741 | A1 | 6/2012 | Gong et al. |
| 2012/0198756 | A1 | 8/2012 | O'Connor et al. |

FOREIGN PATENT DOCUMENTS

| | | |
|---|---|---|
| CN | 101824330 | 9/2010 |
| EP | 231163 | 8/1987 |
| EP | 0321305 | 6/1989 |
| EP | 0649896 | 10/1994 |
| EP | 0649896 | 4/1995 |
| EP | 705321 | 4/1996 |
| EP | 699225 | 3/1999 |
| EP | 0994173 | 9/1999 |
| EP | 994173 | 4/2000 |
| EP | 2053114 | 10/2007 |
| EP | 1903019 | 3/2008 |
| EP | 2108637 | 4/2008 |
| EP | 2107100 | 10/2009 |
| GB | 2166663 | 5/1986 |
| GB | 2371807 | 8/2002 |
| GB | 2386607 | 6/2003 |
| GB | 2447684 | 9/2008 |
| WO | 9321139 | 10/1993 |
| WO | 9426848 | 11/1994 |
| WO | 9500604 | 1/1995 |
| WO | WO9500604 | 1/1995 |
| WO | 9718278 | 5/1997 |
| WO | 2007090884 | 8/2007 |
| WO | 2010002792 | 1/2010 |
| WO | 2010062611 | 6/2010 |
| WO | 2010135734 | 11/2010 |

OTHER PUBLICATIONS

Wilson, Joseph; "Fluid Catalytic Cracking Technology and Operations"; PennWell Publishing; Chapter 3, pp. 101-112; 1997.
Meier, W.M., et al.; "Atlas of Zeolite Structure Types"; Fouth Revised Edition; 1996, Elsevier, ISBN 0-444-10015-6.
Sadeghbeigi, R.; "Project Management and Hardware Design Considerations"; Fluid Catalytic Cracking; pp. 219-223; 1995.
Wilson, Joseph W.; "Riser Termination"; Fluid Catalytic Cracking Technology and Operations; PennWell Publishing Company; Chapter 3; pp. 104-120 and Chapter 6, pp. 186-194; 1997.
Wilson, Joseph W.; Fluid Catalytic Cracking Technology and Operations; PennWell Publishing Company; pp. 14-18 and Chapter 8, pp. 223-235; 1997.
Ancilotti, F. et al., "MTBE from Butadiene-Rich C4s", Hydrocarbon Processing, 1987, pp. 50-53.
Corma, A. et al., "Processing Biomass-Derived Osygenates in the Oil Refinery: Catalytic Cracking (FCC) Reaction Pathways and Role of Catalyst", Journal of Catlysis, 2007, vol. 247, pp. 307-327.
Huber, G.W. et al., "Biorefineries-Synergies Between Bio and Oil Refineries for the Production of Fuels from Biomass", Angewandte Chemie International Ed., 2007, vol. 46, pp. 7184-7201.
State Intellectual Property Office of the People's Republic of China report dated Jul. 22, 2014, Chinese Application No. 201280027753.0 (equiv to US20120277499).
State Intellectual Property Office of the People's Republic of China report dated Aug. 5, 2014, Chinese Application No. 201280027542.7 (equiv. To US20120271075).
State Intellectual Property Office of the People's Republic of China report dated Feb. 15, 2015 2nd Office Action, Chinese Application No. 201280027542.7 (equiv. To US20120271075).
Wilson, J.W., Fluid Catalytic Cracking Technology and Operations,1997, Chapter 4, pp. 1131-1155.
Sadeghbeigi, R., "Fluid Catalytic Cracking Handbook: Design, Operation, and Troubleshooting of FCC Facilities", 1995, pp. 219-223.
Fogassy, G. et al., "Biomass Derived Feedstock Co-Processing With Vacuum Gas Oil for Second-Generation Fuel Production in FCC Units", Applied Catalysis B: Environmental, 2010, vol. 96, pp. 476-485.
Lappas, A.A. et al., "Biomass Pyrolysis in a Circulating Fluid Bed Reactor for the Production of Fuels and Chemicals", 2002, Fuel, vol. 81, pp. 2087-2095.
PCT International Search Report dated Jul. 25, 2012, Application No. PCT/ EP2012/057414 filed Apr. 23, 2012 (euiv to US8927784).
Zhang, Q., et al., "Review of Biomass Pyrolysis Oil Properties and Upgrading Research", Energy Conversion and Management, vol. 48, 2007, pp. 87-92.
French, R. et al., "Catalytic Pyrolysis of Biomass for Biofuels Production", Fuel Processing Technology, Elsevier BV, NL, vol. 91, No. 1, 2010, pp. 25-32.
Lee, Kyung-Hae, et al., "Influence of Reaction Temperature, Pretreatment, and a Char Removal System on the Production of Bio-oil from Rice Straw by Fast Pyrolysis, Using a Fluidized Bed", Energy & Fuels, vol. 19, No. 5, 2005, pp. 2179-2184.

* cited by examiner

PROCESS FOR CONVERTING A SOLID BIOMASS MATERIAL

The present application claims the benefit of U.S. Provisional Patent Application Ser. No. 61/637,046 filed Apr. 23, 2012, the entire disclosure of which is hereby incorporated by reference.

FIELD OF THE INVENTION

The invention relates to a process for converting a solid biomass material and a process for producing a biofuel and/or biochemical.

BACKGROUND TO THE INVENTION

With the diminishing supply of crude mineral oil, use of renewable energy sources is becoming increasingly important for the production of liquid fuels. These fuels from renewable energy sources are often referred to as biofuels.

Biofuels derived from non-edible renewable energy sources, such as cellulosic materials, are preferred as these do not compete with food production. These biofuels are also referred to as second generation, renewable or advanced, biofuels. Most of these non-edible renewable energy sources, however, are solid materials that are cumbersome to convert into liquid fuels.

For example, the process described in WO 2010/062611 for converting solid biomass to hydrocarbons requires three catalytic conversion steps. First the solid biomass is contacted with a catalyst in a first riser operated at a temperature in the range of from about 50 to about 200° C. to produce a first biomass-catalyst mixture and a first product comprising hydrocarbons (referred to as pretreatment). Hereafter the first biomass-catalyst mixture is charged to a second riser operated at a temperature in the range of from about 200° to about 400° C. to thereby produce a second biomass-catalyst mixture and a second product comprising hydrocarbons (referred to as deoxygenating and cracking); and finally the second biomass-catalyst mixture is charged to a third riser operated at a temperature greater than about 450° C. to thereby produce a spent catalyst and a third product comprising hydrocarbons. The last step is referred to as conversion to produce the fuel or specialty chemical product. WO 2010/062611 mentions the possibility of preparing the biomass for co-processing in conventional petroleum refinery units. The process of WO 2010/062611, however, is cumbersome in that three steps are needed, each step requiring its own specific catalyst.

WO2010/135734 describes a method for co-processing a biomass feedstock and a refinery feedstock in a refinery unit comprising catalytically cracking the biomass feedstock and the refinery feedstock in a refinery unit comprising a fluidized reactor, wherein hydrogen is transferred from the refinery feedstock to the carbon and oxygen of the biomass feedstock. In one of the embodiments of WO2010/135734 the biomass feedstock comprises a plurality of solid biomass particles having an average size between 50 and 1000 microns. In passing, it is further mentioned that solid biomass particles can be pre-processed to increase brittleness, susceptibility to catalytic conversion (e.g. by roasting, toasting, and/or torrefication) and/or susceptibility to mixing with a petrochemical feedstock.

SUMMARY OF THE INVENTION

In order to scale up the catalytic cracking of solid biomass material to a commercial scale, the process may require improvements to reduce coking.

Accordingly the present invention provides a process for converting a solid biomass material, comprising contacting the solid biomass material and a hydrocarbon co-feed with a catalytic cracking catalyst at a temperature of more than 400° C. in a riser reactor to produce one or more cracked products, wherein the solid biomass material is introduced to the riser reactor at a location downstream of the location where the hydrocarbon co-feed is introduced to the riser reactor.

DETAILED DESCRIPTION OF THE INVENTION

Figure 1:
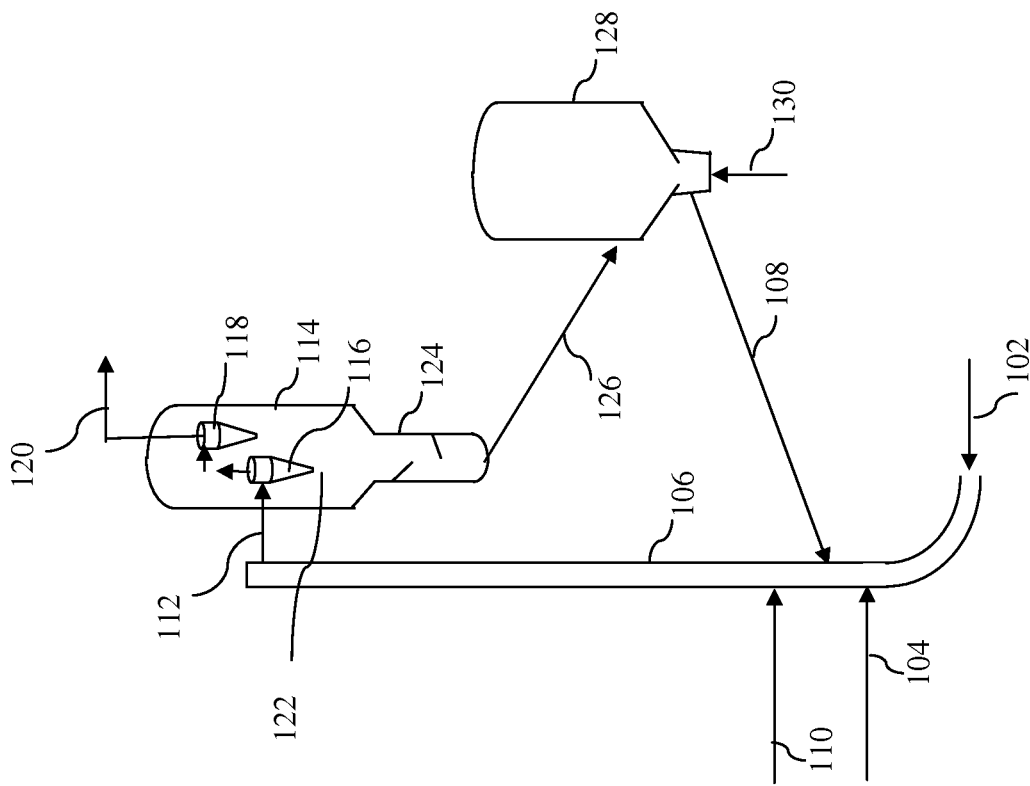
FIG. 1 shows a schematic diagram of one embodiment of the process according to the invention.

Without wishing to be bound by any kind of theory, it is believed that the catalytic cracking of a solid biomass material in a riser reactor may lead to more coke formation than the catalytic cracking of conventional FCC feedstock in such riser reactor. For example, it is believed that the processing of solid biomass particles in a manner as described in WO2010/135734 may lead to excessive coke formation in the reactor. Such increased coke formation may cause increased coke deposits. Coke deposits on the riser reactor walls—even if limited in size—may cause disruption of the plug flow behaviour and may lead to unstable process conditions and a decrease in the robustness of the process. The coke deposits may further increase the risk on plugging of the reactor and may make it difficult to control temperatures. This in turn may require one to introduce additional maintenance stops.

It has now for the first time been realized that by feeding a solid biomass material to a riser reactor at a location downstream of the location where a hydrocarbon co-feed is supplied, coking can be reduced. The reduced coking in turn may reduce the risk on disruption of the plug flow behaviour and the risk on plugging of the reactor and may increase temperature control and robustness of operation. This in turn may reduce the number of maintenance stops required.

The process according to the invention advantageously allows the hydrocarbon co-feed to contact the catalytic cracking catalyst first, thereby generating hydrogen. The availability of this hydrogen assists in the reduction of coke formation when the solid biomass material is contacted with the catalytic cracking catalyst more downstream in the riser reactor. Without wishing to be bound by any kind of theory it is believed that under the catalytic cracking conditions existing during operation of the riser reactor, the hydrogen leads to so-called hydroliquefaction of at least part of the solid biomass material. Subsequently in-situ formed liquefied biomass can be contacted with the catalytic cracking catalyst leading to less coke formation.

The process according to the invention can be easily implemented in existing refineries.

In addition, the process according to the invention may not need any complicated actions, for example it may not need a pre-mixed composition of any solid biomass material and the catalyst.

The one or more cracked products produced by the process according to the invention can be used as an intermediate to prepare a biofuel and/or biochemical component. Such a process can simple and can be carried out in just one riser reactor. It may further require a minimum of processing steps to convert a solid biomass material to a biofuel component and/or biochemical component. Such biofuel component may be fully fungible.

The biofuel and/or biochemical component(s) may advantageously be further converted to and/or blended with one or more further components into novel biofuels and/or biochemicals.

The process according to the invention therefore also provides a more direct route via conversion of solid biomass material to second generation, renewable or advanced, biofuels and/or biochemicals.

By a solid biomass material is herein understood a solid material obtained from a renewable source. By a renewable source is herein understood a composition of matter of biological origin. Preferably the renewable source is a composition of matter of cellulosic or lignocellulosic origin as opposed to a composition of matter obtained or derived from petroleum, natural gas or coal.

Preferably the renewable source is a composition of matter of cellulosic or lignocellulosic origin. Any solid biomass material may be used in the process of the invention. In a preferred embodiment the solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose- and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof.

The solid biomass material may have undergone drying, torrefaction, steam explosion, particle size reduction, densification and/or pelletization before being contacted with the catalyst, to allow for improved process operability and economics.

Preferably the solid biomass material is a torrefied solid biomass material. In a preferred embodiment the process according to the invention comprises a step of torrefying a solid biomass material at a temperature of more than 200° C. to produce a torrefied solid biomass material that is subsequently contacted with the catalytic cracking catalyst. The words torrefying and torrefaction are used interchangeable herein.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C. The words torrefying and torrefaction are used interchangeable herein.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The torrefying step may be carried out batchwise or continuously.

The torrefied solid biomass material has a higher energy density, a higher mass density and greater flowability, making it easier to transport, pelletize and/or store. Being more brittle, it can be easier reduced into smaller particles.

In a further preferred embodiment, any torrefying or torrefaction step further comprises drying the solid biomass material before such solid biomass material is torrefied. In such a drying step, the solid biomass material is preferably dried until the solid biomass material has a moisture content in the range of equal to or more than 0.1 wt % to equal to or less than 25 wt %, more preferably in the range of equal to or more than 5 wt % to equal to or less than 20 wt %, and most preferably in the range of equal to or more than 5 wt % to equal to or less than 15 wt %. For practical purposes moisture content can be determined via ASTM E1756-01 Standard Test method for Determination of Total solids in Biomass. In this method the loss of weight during drying is a measure for the original moisture content.

Preferably the solid biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. In a preferred embodiment the process according to the invention comprises a step of reducing the particle size of the solid biomass material, optionally before or after such solid biomass material is torrefied. Such a particle size reduction step may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 5 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

Most preferably the solid biomass material has a particle size distribution where the mean particle size is equal to or more than 100 micrometer to avoid blocking of pipelines and/or nozzles. Most preferably the solid biomass material has a particle size distribution where the mean particle size is equal to or less than 3000 micrometer to allow easy injection into the riser reactor.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

Hence, preferably the process of the invention comprises a step of reducing the particle size of a solid biomass material, optionally before and/or after torrefaction, to generate a particle size distribution having a mean particle size in the range from equal to or more than 5, more preferably equal to or more than 10 micron, and most preferably equal to or more than 20 micron, to equal to or less than 5000 micron, more preferably equal to or less than 1000 micrometer and most preferably equal to or less than 500 micrometer to produce a micronized, optionally torrefied, solid biomass material, which micronized solid biomass material is subsequently contacted with the catalytic cracking catalyst.

In an optional embodiment the particle size reduction of the, optionally torrefied, solid biomass material is carried out whilst having the solid biomass material suspended in a liquid to improve processability and/or avoid dusting. The liquid can be water; a hydrocarbon-containing liquid, such as for example gasoline, naphtha, diesel, kerosine or a mixture thereof; or a mixture of water and such a hydrocarbon-containing liquid.

In a preferred embodiment the solid biomass material is dried before being supplied to the riser reactor. Hence, if the solid biomass material is a solid torrefied biomass material, it may be dried before and/or after torrefaction. If dried before use as a feed to the riser reactor, the solid biomass material is preferably dried at a temperature in the range from equal to or more than 50° C. to equal to or less than 200° C., more preferably in the range from equal to or more than 80° C. to equal to or less than 150° C. The solid biomass material is preferably dried for a period in the range from equal to or more than 30 minutes to equal to or less than 2 days, more preferably for a period in the range from equal to or more than 2 hours to equal to or less than 24 hours.

In addition to the solid biomass material also a hydrocarbon co-feed is contacted with the catalytic cracking catalyst in the riser reactor.

By a hydrocarbon co-feed is herein understood a co-feed that contains one or more hydrocarbon compounds. By a hydrocarbon compound is herein understood a compound that contains hydrogen and carbon and preferably consists of hydrogen and carbon. Preferably the hydrocarbon co-feed is a fluid hydrocarbon co-feed (also sometimes referred to herein as fluid hydrocarbon feed). By a fluid hydrocarbon co-feed is herein understood a hydrocarbon co-feed that is not in a solid state when contacted with the catalytic cracking catalyst. The hydrocarbon co-feed can suitably be introduced into the riser reactor via a feed nozzle. The hydrocarbon co-feed is preferably introduced into the riser reactor in an essentially liquid state, or in a partially liquid-partially gaseous state. Preferably equal to or more than 60 wt %, preferably equal to or more than 70 wt %, still more preferably equal to or more than 80 wt % and most preferably equal to or more than 90 wt % of the hydrocarbon co-feed is introduced into the riser reactor in the liquid state. Most preferably essentially 100% of the hydrocarbon co-feed is liquid at the moment of introduction into the riser reactor. For hydrocarbon co-feeds that are highly viscous, it may therefore be advantageous to preheat such feeds before entering the feed nozzle. For example, hydrocarbon co-feeds such as a long residue, a vacuum gas oil and/or mixtures thereof may be preheated to a temperature equal to or above 250° C. In a feed nozzle, the hydrocarbon co-feed may be atomized, for example with help of steam, allowing the hydrocarbon co-feed to vaporize essentially immediately after introduction into the riser reactor.

Hence, preferably the hydrocarbon co-feed vaporizes upon entry and preferably is contacted in a gaseous state with the catalytic cracking catalyst and/or the solid biomass material.

The hydrocarbon co-feed can be a renewable hydrocarbon co-feed such as for example a vegetable oil, a pyrolysis oil, a liquefied biomass and/or a mixture thereof.

Preferably, however, the hydrocarbon co-feed is a non-renewable hydrocarbon co-feed. By a non-renewable hydrocarbon co-feed is herein understood a hydrocarbon co-feed that is not obtained from a renewable source. The hydrocarbon co-feed may for example be obtained from a conventional crude oil (also sometimes referred to as a petroleum oil or mineral oil), an unconventional crude oil (that is, oil produced or extracted using techniques other than the traditional oil well method), a Fisher Tropsch oil (sometimes also referred to as a synthetic oil) and/or a mixture of any of these.

In one embodiment the hydrocarbon co-feed is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil. More preferably the hydrocarbon co-feed comprises a fraction of a, preferably conventional, crude oil. Preferred hydrocarbon co-feeds include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the hydrocarbon co-feed comprises a long residue, a vacuum gas oil or a mixture thereof.

In one embodiment the hydrocarbon co-feed preferably has a 5 wt % boiling point at a pressure of 1 bar absolute (0.1 MegaPascal) of equal to or more than 100° C., more preferably equal to or more than 150° C., as measured by means of distillation as based on ASTM D86 titled "Standard Test Method for Distillation of Petroleum Products at Atmospheric Pressure" respectively as measured by ASTM D1160 titled "Standard Test Method for Distillation of Petroleum Products at Reduced Pressure". An example of such a hydrocarbon co-feed is vacuum gas oil.

In another embodiment the hydrocarbon co-feed preferably has a 5 wt % boiling point at a pressure of 1 bar absolute (0.1 MegaPascal) of equal to or more than 200° C., more preferably equal to or more than 220° C., most preferably equal to or more than 240° C., as measured by means of distillation based on ASTM D86 titled "Standard Test Method for Distillation of Petroleum Products at Atmospheric Pressure", respectively as measured by ASTM D1160 titled "Standard Test Method for Distillation of Petroleum Products at Reduced Pressure". An example of such a hydrocarbon co-feed is long residue.

In a further embodiment equal to or more than 70 wt %, preferably equal to or more than 80 wt %, more preferably equal to or more than 90 wt % and still more preferably equal to or more than 95 wt % of the hydrocarbon co-feed boils in the range from equal to or more than 150° C. to equal to or less than 600° C. at a pressure of 1 bar absolute (0.1 MegaPascal), as measured by means of a distillation by ASTM D86 titled "Standard Test Method for Distillation of Petroleum Products at Atmospheric Pressure", respectively as measured by ASTM D1160 titled "Standard Test Method for Distillation of Petroleum Products at Reduced Pressure".

The composition of the hydrocarbon co-feed may vary widely. The hydrocarbon co-feed may for example contain paraffins (such as for example naphthenes), olefins and aromatics.

Preferably the hydrocarbon co-feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the hydrocarbon co-feed.

More preferably the hydrocarbon co-feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total weight of hydrocarbon co-feed. By paraffins all of normal-, cyclo- and branched-paraffins are understood.

In yet another embodiment the hydrocarbon co-feed comprises or consists of a paraffinic hydrocarbon co-feed. By a paraffinic hydrocarbon co-feed is herein understood a hydrocarbon co-feed comprising in the range from at least 50 wt % of paraffins, preferably at least 70 wt % of paraffins, and most preferably at least 90 wt % paraffins, up to and including 100 wt % paraffins, based on the total weight of the hydrocarbon co-feed. For practical purposes the paraffin content of hydrocarbon co-feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other hydrocarbon co-feeds the paraffin content of the hydrocarbon co-feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic hydrocarbon co-feeds include so-called Fischer-Tropsch derived hydrocarbon streams such as described in WO2007090884 and US2009/026112 which disclosure is herein incorporated by reference, or a hydrogen rich feed like hydrotreater product or hydrowax. By hydrowax is understood the bottoms fraction of a hydrocracker. Examples of hydrocracking processes which may yield a bottoms fraction that can be used as hydrocarbon co-feed, are described in EP-A-699225, EP-A-649896, WO-A-97/18278, EP-A-705321, EP-A-994173, U.S. Pat. No. 5,580,442 and U.S. Pat. No. 4,851,109 which disclosure is herein incorporated by reference.

By "Fischer-Tropsch derived hydrocarbon stream" is meant that the hydrocarbon stream is a product from a Fischer-Tropsch hydrocarbon synthesis process or derived from such product by a hydroprocessing step, i.e. hydrocracking, hydro-isomerisation and/or hydrogenation.

The Fischer-Tropsch derived hydrocarbon stream may suitably be a so-called syncrude as described in for example GB-A-2386607, GB-A-2371807 or EP-A-0321305. Other suitable Fischer-Tropsch hydrocarbon streams may be hydrocarbon fractions boiling in the naphtha, kerosene, gas oil, or wax range, as obtained from the Fischer-Tropsch hydrocarbon synthesis process, optionally followed by a hydroprocessing step.

The weight ratio of the solid biomass material to hydrocarbon co-feed may vary widely. For ease of co-processing the weight ratio of hydrocarbon co-feed to solid biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of hydrocarbon co-feed to solid biomass material is preferably equal to or less than 99.9 to 0.1 (99.9:0.1), more preferably equal to or less than 95 to 5 (95:5). The hydrocarbon co-feed and the solid biomass material are preferably being fed to the riser reactor in a weight ratio within the above ranges.

The amount of solid biomass material, based on the total weight of solid biomass material and hydrocarbon co-feed supplied to the riser reactor, is preferably equal to or less than 30 wt %, more preferably equal to or less than 20 wt %, most preferably equal to or less than 10 wt % and even more preferably equal to or less than 5 wt %. For practical purposes the amount of solid biomass material present, based on the total weight of solid biomass material and hydrocarbon co-feed supplied to the riser reactor, is preferably equal to or more than 0.1 wt %, more preferably equal to or more than 1.0 wt %.

In a preferred embodiment the hydrocarbon co-feed comprises equal to or more than 8 wt % elemental hydrogen (i.e. hydrogen atoms), more preferably more than 12 wt % elemental hydrogen, based on the total hydrocarbon co-feed on a dry basis (i.e. water-free basis). A high content of elemental hydrogen, such as a content of equal to or more than 8 wt %, improves the ability of the hydrocarbon co-feed to act as a cheap hydrogen donor in the catalytic cracking process. A particularly preferred hydrocarbon co-feed having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

Without wishing to be bound by any kind of theory it is further believed that a higher weight ratio of hydrocarbon co-feed to solid biomass material enables more upgrading of the solid biomass material by hydrogen transfer reactions.

The solid biomass material is contacted with the catalytic cracking catalyst in a riser reactor.

By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably essentially tube-shaped, reactor is preferably oriented in an essentially vertical manner. Preferably a fluidized catalytic cracking catalyst flows from the bottom of the riser reactor upwards to the top of the riser reactor. Preferably the riser reactor is part of a catalytic cracking unit (i.e. as a catalytic cracking reactor), more preferably a fluidized catalytic cracking (FCC) unit.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

For example, the riser reactor may be a so-called internal riser reactor or a so-called external riser reactor as described therein.

By an internal riser reactor is herein preferably understood an essentially vertical, preferably essentially tube-shaped, reactor, that may have an essentially vertical upstream end located outside a vessel and an essentially vertical downstream end located inside the vessel. The vessel is suitably a reaction vessel suitable for catalytic cracking reactions and/or a vessel that comprises one or more cyclone separators and/or swirl tubes. The internal riser reactor is especially advantageous because in the process according to the invention, the solid biomass material may be partly converted into a liquefied biomass. Without wishing to be bound to any kind of theory it is believed that this liquefied biomass may be more prone to polymerization than conventional oils due to oxygen-containing hydrocarbons and/or olefins that may be present in the intermediate oil product. By reducing polymerization of the olefins formed, also the overall olefin yield may be increased. In addition the liquefied biomass may be more corrosive than conventional oils due to oxygen-containing hydrocarbons that may be present. Further the internal riser reactor may be less sensitive to erosion by any unconverted particles of solid biomass material. The use of an internal riser reactor allows one to reduce the risk of plugging due to polymerization and/or to reduce the risk of corrosion and/or erosion, thereby increasing safety and hardware integrity.

By an external riser reactor is herein preferably understood a riser reactor that is located outside a vessel. The external riser reactor can suitably be connected via a so-called crossover to a vessel. Preferably the external riser reactor comprises a, preferably essentially vertical, riser reactor pipe. Such a riser reactor pipe is located outside a vessel. The riser reactor pipe may suitably be connected via a, preferably essentially horizontal, downstream crossover pipe to a vessel. The downstream crossover pipe preferably has a direction essentially transverse to the direction of the riser reactor pipe. The vessel may suitably be a reaction vessel suitable for catalytic cracking reactions and/or a vessel that comprises one or more cyclone separators and/or swirl separators. Suitably the crossover pipe may also connect directly to a cyclone and/or swirl separator.

It is also possible for the external riser reactor to be part of a so-called U-bend. In such a case one leg of the U-bend may be used as standpipe and the other leg of the U-bend may be used as riser reactor. For example, regenerated catalyst may flow from a catalyst regenerator into an inlet at the upstream top of the U-bend downwardly through the bend and subsequently upwardly to the outlet at the downstream top of the U-bend.

When an external riser reactor is used, it may be advantageous to use an external riser reactor with a curve or low velocity zone at its upper end as for example illustrated in the Handbook titled "Fluid Catalytic Cracking technology and operations", by Joseph W. Wilson, published by PennWell Publishing Company (1997), chapter 3, FIG. 3-7, herein incorporated by reference. The curve and/or low velocity zone may for example connect the riser reactor pipe and the so-called crossover pipe.

By a low velocity zone is herein preferably understood a zone or an area within the external riser reactor where the velocity of the, preferably fluidized, catalytic cracking catalyst shows a minimum. The low velocity zone may for example comprise an accumulation space located at the most downstream end of the upstream riser reactor pipe as described above, extending such riser reactor pipe beyond the connection with the crossover pipe. An example of a low velocity zone is the so-called "Blind Tee".

It has been advantageously found that a part of the catalytic cracking catalyst may deposit in the curve or low velocity zone, thereby forming a protective layer against corrosion and/or erosion by the catalytic cracking catalyst and/or any residual solid biomass material and against corrosion by any oxygen-containing hydrocarbons.

In the process according to the invention the solid biomass material is supplied to the riser reactor at a location downstream of the location where the hydrocarbon co-feed is supplied. Without wishing to be bound by any kind of theory it is believed that this allows the hydrocarbon co-feed to be contacted with the catalytic cracking catalyst first; allowing the hydrocarbon co-feed to be at least partly converted thereby generating hydrogen, which hydrogen subsequently assists in reducing coke formation when the solid biomass material is contacted with the catalytic cracking catalyst.

The solid biomass material is preferably supplied to the riser reactor in the bottom half, more preferably in the bottom quarter, and even more preferably in the bottom tenth of the riser reactor.

In a preferred embodiment the process according to the invention further comprises introducing a liftgas to the riser reactor. If present, such a liftgas is preferably introduced to the riser reactor at a location upstream of the location where the hydrocarbon co-feed is introduced to the riser reactor. Hence in a preferred embodiment the invention provides a process for converting a solid biomass material, comprising contacting the solid biomass material and a hydrocarbon co-feed with a catalytic cracking catalyst in the presence of a liftgas at a temperature of more than 400° C. in a riser reactor to produce one or more cracked products, wherein the solid biomass material is introduced to the riser reactor at a location downstream of the location where the hydrocarbon co-feed is introduced to the riser reactor; and wherein the liftgas is introduced to the riser reactor at a location upstream of the location where the hydrocarbon co-feed is introduced to the riser reactor.

The liftgas is preferably in an essentially gaseous state at the moment of introduction into the riser reactor. For example, at least 85 wt %, more preferably at least 90 wt %, even more preferably at least 95 wt % and most preferably essentially 100 wt % of the liftgas is in the gaseous state when the liftgas is introduced into the riser reactor.

Examples of such a liftgas include steam, gases such as methane, ethane, ethene, nitrogen and/or hydrogensulfide, and/or mixtures thereof. If present, any hydrocarbon compounds contained in any hydrocarbon-containing liftgas are preferably hydrocarbon compounds boiling at or below 250° C., such as for example ethene, ethane, propane and propene. Vaporized oil and/or vaporized oil fractions (preferably vaporized liquefied petroleum gas, vaporized gasoline, vaporized diesel, vaporized kerosene or vaporized naphtha) can be used as a liftgas but are less preferred as the use thereof as liftgas may lead to uncontrolled cracking reactions. Hence, preferably the liftgas does not contain vaporized oil and/or vaporized oil fractions such as for example vaporized liquefied petroleum gas, vaporized gasoline, vaporized diesel, vaporized kerosene and/or vaporized naphtha.

Steam is most preferred as a lift gas. In a most preferred embodiment the liftgas consists of steam.

In a preferred embodiment the riser reactor is a riser reactor comprising a bottom section and a riser reactor pipe, where the most downstream part of the bottom section has an inner diameter that is larger than the inner diameter of the most upstream part of the riser reactor pipe. Such a bottom section is sometimes also referred to as an "enlarged" bottom section or liftpot. The enlarged bottom section allows for additional time to convert the hydrocarbon co-feed and generate the hydrogen needed for the conversion of the solid biomass material downstream.

Such a bottom section preferably has a diameter in the range from equal to or more than 0.4 to equal to or less than 5 meters, most preferably a diameter in the range from equal to or more than 1 to equal to or less than 2 meters. The height of the bottom section or liftpot preferably lies in the range from equal to or more than 1 meter to equal to or less than 5 meter.

In a further preferred embodiment the riser reactor pipe may have a diameter that increases in a downstream direction to allow for the increasing gas volume generated during the conversion of the solid biomass material. The increase of diameter may be intermittent, resulting in two or more sections of the riser reactor having a fixed diameter, wherein each preceding section has a smaller diameter than the subsequent section, when going in a downstream direction; the increase of diameter may be gradual, resulting in a gradual increase of the riser reactor diameter in a downstream direction; or the increase in diameter may be a mixture of gradual and intermittent increases.

The length of the riser reactor (i.e. the total of the bottom section and the riser reactor pipe) may vary widely. For practical purposes the riser reactor preferably has a length in the range from equal to or more than 10 meters, more preferably equal to or more than 15 meters and most preferably equal to or more than 20 meters, to equal to or less than 65 meters, more preferably equal to or less than 55 meters and most preferably equal to or less than 45 meters.

Preferably the temperature in the riser reactor ranges from equal to or more than 450° C., more preferably from equal to or more than 480° C., to equal to or less than 800° C., more preferably equal to or less than 750° C.

A catalytic cracking catalyst may be introduced into the riser reactor at a temperature of for example in the range from 550° C. to 800° C. The heat supplied by the catalytic cracking catalyst can conveniently be used to vaporize the hydrocarbon co-feed. As a consequence the temperature of the catalytic cracking catalyst may decrease. The temperature of the catalytic cracking catalyst after contact with the hydrocarbon co-feed may for example range from 400° C. to 750° C., more preferably from 450° C. to 700° C., and most preferably from 480° C. to 650° C. The temperature T1 at the location where the hydrocarbon co-feed is introduced into the riser reactor may be higher than the temperature T2 at the location where the solid biomass is introduced into the riser reactor. For example T1 may be in the range from 5° C. to 100° C., more preferably in the range from 5° C. to 50° C. higher than T2.

Preferably the pressure in the riser reactor ranges from equal to or more than 0.5 bar absolute to equal to or less than 10 bar absolute (0.05 MegaPascal-1 MegaPascal), more preferably from equal to or more than 1.0 bar absolute to equal to or less than 6 bar absolute (0.1 MegaPascal to 0.6 MegaPascal).

The total average residence time of each of the solid biomass material and the hydrocarbon co-feed independently lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds.

Residence time as referred to in this patent application is based on the vapour residence at outlet conditions, that is, residence time includes not only the residence time of a specified feed (such as for example the solid biomass material) but also the residence time of its conversion products.

The weight ratio of catalyst to feed (that is the total feed of solid biomass material and the hydrocarbon co-feed)—herein also referred to as catalyst:feed ratio-preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The weight ratio of catalyst to solid biomass material (catalyst:solid biomass material ratio) at the location where the solid biomass material is supplied to the riser reactor preferably lies in the range from equal to or more than 1:1, more preferably from equal to or more than 2:1 and most preferably from equal to or more than 3:1 to equal to or less than 150:1, more preferably to equal to or less than 100:1, even more preferably to equal to or less than 50:1, most preferably to equal to or less than 20:1.

In the process according to the invention the hydrocarbon co-feed is introduced to the riser reactor upstream of the solid biomass material. In a preferred embodiment the solid biomass material may be introduced to the riser reactor at a location where the hydrocarbon co-feed already had a residence time in the range from equal to or more than 0.01 seconds, more preferably from equal to or more than 0.05 seconds, and most preferably from equal to or more than 0.1 seconds to equal to or less than 2 seconds, more preferably to equal to or less than 1 seconds, and most preferably to equal to or less than 0.5 seconds.

In a preferred embodiment the ratio between the total residence time for the hydrocarbon co-feed to the total residence time for the solid biomass material (residence hydrocarbon: residence biomass ratio) lies in the range from equal to or more than 1.01:1, more preferably from equal to or more than 1.1:1 to equal to or less than 3:1, more preferably to equal to or less than 2:1.

The solid biomass material and the hydrocarbon co-feed can be supplied to the riser reactor in any manner known to the person skilled in the art.

The solid biomass material is preferably supplied to the riser reactor with the help of a screw feeder.

The catalytic cracking catalyst is preferably introduced into the riser reactor at a location downstream of the introduction of any liftgas and preferably upstream of the introduction of the solid biomass material. The catalytic cracking catalyst may further be introduced into the riser reactor at a location upstream or downstream of the location where the hydrocarbon co-feed is introduced.

The catalytic cracking catalyst is preferably a fluidized catalytic cracking (FCC) catalyst. The catalytic cracking catalyst preferably comprises a zeolite (also sometimes referred to as a crystalline aluminosilicate), preferably dispersed in an amorphous matrix component. For example the catalytic cracking catalyst may comprise amorphous silica alumina and a zeolite. In addition, the catalytic cracking catalyst preferably comprises a binder and/or a filler.

In a preferred embodiment the catalytic cracking catalyst includes a so-called "large pore" zeolite. By a "large pore" zeolite is herein understood a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite.

In a preferred embodiment the catalytic cracking catalyst includes a zeolite chosen from the group consisting of Y zeolites; ultrastable Y zeolites (USY); X zeolites, zeolite beta, zeolite L, offretite, mordenite, faujasite (including synthetic faujasite), and zeolite omega, Rare Earth zeolite Y (=REY) and Rare Earth USY (REUSY).

If the catalytic cracking catalyst comprises a Y-type zeolite, such a Y-type zeolite preferably comprises an overall silica-to-alumina mole ratio of more than 3.0, more preferably an overall silica-to alumina mole ratio of between about 3.0 and about 6.0.

The catalytic cracking catalyst can also comprise a so-called medium pore zeolite" in addition to the above mentioned zeolites. By a "medium pore" zeolite is herein understood a zeolite comprising a porous, crystalline aluminosilicate structure having a porous internal cell structure on which the major axis of the pores is in the range of 0.45 nanometer to 0.62 nanometer.

Hence, in addition to the above mentioned zeolites, the catalytic cracking catalyst preferably includes a zeolite chosen from the group consisting of MFI type zeolites (such as for example ZSM-5); MTW type zeolites (such as for example ZSM-12); MTT type zeolites (such as for example ZSM-23); the TON type zeolites (such as for example zeolite theta one or ZSM-22); and the FER structural type, for example, ferrierite. Of these MFI type zeolites, preferably ZSM-5, are most preferred.

In a preferred embodiment the catalytic cracking catalyst comprises zeolite Y or ultrastable zeolite Y (USY) in combination with an MFI type zeolite such as ZSM-5.

If the catalytic cracking catalyst comprises both a large pore zeolite and a medium pore zeolite, the ratio of the large pore zeolite to the medium pore size zeolite in the Catalytic cracking catalyst is preferably in the range of 99:1 to 70:30, more preferably in the range of 98:2 to 85:15.

In a preferred embodiment the stability and/or acidity of a zeolite used in the Catalytic cracking catalyst can be increased by exchanging the zeolite with hydrogen ions, ammonium ions, polyvalent metal cations, such as rare earth-containing cations, magnesium cations or calcium cations, or a combination of hydrogen ions, ammonium ions and polyvalent metal cations, thereby lowering the sodium content until it is less than about 0.8 weight percent, preferably less than about 0.5 weight percent and or less than about 0.3 weight percent, calculated as $Na_2O$.

The catalytic cracking catalyst further preferably comprises an amorphous matrix component. Examples of such an amorphous matrix include amorphous silica-alumina, amorphous silica, amorphous alumina, amorphous titania, amorphous zirconia and amorphous magnesium oxide, or combinations of two or more of these.

In addition the catalytic cracking catalyst may comprise binders and/or fillers. An example of a binder is silica sol. Examples of fillers include natural or synthetic clays, pillared or delaminated clays, or mixtures of one or more of these. Examples of clays which may be present in the Catalytic cracking catalyst include kaolin, hectorite, sepiolite and attapulgite.

In addition to the above, the catalytic cracking catalyst may contain one or more hydrogenation metal(s). Without wishing to be bound by any kind of theory, it is believed that this may assist in hydroliquefaction of the solid biomass material. Such one or more hydrogenation metal(s) are preferably chosen from Group VIII and/or Group VIB of the Periodic Table of Elements. The hydrogenation metal may for example be present as a mixture, alloy or organometallic compound. Preferably the one or more hydrogenation metal(s) is chosen from the group consisting of Nickel (Ni), Chromium (Cr), Molybdenum (Mo), Tungsten (W), Cobalt (Co), Platinum (Pt), Palladium (Pd), Rhodium (Rh), Ruthenium (Ru), Iridium (Ir), Osmium (Os), Copper (Cu), iron (Fe), Zink (Zn), Gallium (Ga), Indium (In), Vanadium (V) and mixtures thereof. The one or more metal(s) may be present in elementary form; in the form of alloys or mixtures; and/or in the form of oxides, sulfides or other metal-organic compounds.

If the catalytic cracking catalyst contains a hydrogenation metal, Nickel is most preferred as a hydrogenation metal.

The total amount of zeolite that is present in the Catalytic cracking catalyst is preferably in the range of 5 wt % to 50 wt %, more preferably in the range of 10 wt % to 30 wt %, and even more preferably in the range of 10 wt % to 25 wt % relative to the total mass of the Catalytic cracking catalyst, whilst the remainder is preferably amorphous matrix component, binder and/or filler.

Preferably, the solid biomass material and the hydrocarbon co-feed flow co-currently in the same direction. The catalytic cracking catalyst can be contacted in a cocurrent-flow, countercurrent-flow or cross-flow configuration with such a flow of the solid biomass material and the hydrocarbon co-feed. Preferably the catalytic cracking catalyst is contacted in a cocurrent flow configuration with a cocurrent flow of the solid biomass material and the hydrocarbon co-feed.

In a preferred embodiment the process according to the invention comprises:

a catalytic cracking step comprising contacting the solid biomass material and the hydrocarbon co-feed, optionally in the presence of a liftgas, with a catalytic cracking catalyst at a temperature of more than 400° C. in a riser reactor to produce one or more cracked products and a spent catalytic cracking catalyst;

a separation step comprising separating the one or more cracked products from the spent catalytic cracking catalyst;

a regeneration step comprising regenerating spent catalytic cracking catalyst to produce a regenerated catalytic cracking catalyst, heat and carbon dioxide; and a recycle step comprising recycling the regenerated catalytic cracking catalyst to the catalytic cracking step.

The catalytic cracking step is preferably carried out as described herein before. In the riser reactor the solid biomass material is contacted with the catalytic cracking catalyst at a location downstream of the location where the hydrocarbon co-feed is contacted with the catalytic cracking catalyst.

The separation step is preferably carried out with the help of one or more cyclone separators and/or one or more swirl tubes. Suitable ways of carrying out the separation step are for example described in the Handbook titled "Fluid Catalytic Cracking; Design, Operation, and Troubleshooting of FCC Facilities" by Reza Sadeghbeigi, published by Gulf Publishing Company, Houston Texas (1995), especially pages 219-223 and the Handbook "Fluid Catalytic Cracking technology and operations", by Joseph W. Wilson, published by PennWell Publishing Company (1997), chapter 3, especially pages 104-120, and chapter 6, especially pages 186 to 194, herein incorporated by reference. The cyclone separators are preferably operated at a velocity in the range from 18 to 80 meters/second, more preferably at a velocity in the range from 25 to 55 meters/second.

In addition the separation step may further comprise a stripping step. In such a stripping step the spent catalyst may be stripped to recover the products absorbed on the spent catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration coke, that can be deposited on the catalyst as a result of the catalytic cracking reaction, is burned off to restore the catalyst activity.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor.

Preferably the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.5 bar absolute to equal to or less than 10 bar absolute (0.05 MegaPascal to 1 MegaPascal), more preferably from equal to or more than 1.0 bar absolute to equal to or less than 6 bar absolute (0.1 MegaPascal to 0.6 MegaPascal).

The regenerated catalytic cracking catalyst can be recycled to the catalytic cracking step. In a preferred embodiment a side stream of make-up catalyst is added to the recycle stream to make-up for loss of catalyst in the reaction zone and regenerator.

In the process according to the invention one or more cracked products are produced. As indicated herein, the one or more cracked products may contain one or more oxygen-containing-hydrocarbons. Examples of such oxygen-containing-hydrocarbons include ethers, esters, ketones, acids and alcohols.

In a preferred embodiment this/these one or more cracked products is/are subsequently fractionated to produce one or more product fractions.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), pages 14 to 18, and chapter 8, especially pages 223 to 235.

The one or more product fractions may contain one or more oxygen-containing-hydrocarbons. Examples of such oxygen-containing-hydrocarbons include ethers, esters, ketones, acids and alcohols.

In a further embodiment at least one of the one or more product fractions obtained by fractionation are subsequently hydrodeoxygenated to produce a hydrodeoxygenated product fraction. This/these hydrodeoxygenated product fraction(s) may be used as biofuel and/or biochemical component(s).

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

The hydrodeoxygenation preferably comprises contacting of the one or more product fractions with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute to equal to or less than 350 bar absolute; and at a partial hydrogen pressure in the range of equal to or more than 2 bar absolute to equal to or less than 350 bar absolute.

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support.

Most preferred are hydrodeoxygenation catalysts comprising Rhodium on alumina ($Rh/Al_2O_3$), Rhodium-Cobalt on alumina ($RhCo/Al_2O_3$), Nickel-Copper on alumina ($NiCu/Al_2O_3$), Nickel-Tungsten on alumina ($NiW/Al_2O_3$), Cobalt-Molybdenum on alumina ($CoMo/Al_2O_3$) or Nickel-Molybdenum on alumina ($NiMo/Al_2O_3$).

If the one or more product fractions also contain one or more sulphur-containing hydrocarbons it may be advantageous to use a sulphided hydrodeoxygenation catalyst. If the hydrodeoxygenation catalyst is sulphided the catalyst may be sulphided in-situ or ex-situ.

In addition to the hydrodeoxygenation, the one or more product fractions may be subjected to hydrodesulphurization, hydrodenitrogenation, hydrocracking and/or hydroisomerization. Such hydrodesulphurization, hydrodenitrogenation, hydrocracking and/or hydroisomerization may be carried out before, after and/or simultaneously with the hydrodeoxygenation.

In a preferred embodiment the one or more product fractions produced in the fractionation; and/or the one or more hydrodeoxygenated product(s) produced in the hydrodeoxygenation can be blended as a biofuel component and/or a biochemical component with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components, but also conventional petroleum derived gasoline, diesel and/or kerosene fractions.

Alternatively the one or more product fractions and/or the one or more hydrodeoxygenated product(s) can be used as an intermediate in the preparation of a biofuel component and/or a biochemical component. In such a case the biofuel component and/or biochemical component may be subsequently blended with one or more other components (as listed above) to prepare a biofuel and/or a biochemical.

By a biofuel respectively a biochemical is herein understood a fuel or a chemical that is at least party derived from a renewable energy source.

In FIG. 1 one embodiment according to the invention is illustrated. In FIG. 1, a liftgas consisting of steam (102) is introduced into a riser reactor (106). Subsequently a hydrocarbon co-feed (104) is introduced. In the bottom of the riser reactor (106), the hydrocarbon co-feed (104) and the steam (102) are mixed with hot regenerated catalytic cracking catalyst (108). The mixture of catalytic cracking catalyst (108), hydrocarbon co-feed (104) and steam (102) is forwarded into the riser reactor (106). At least part of the hydrocarbon co-feed (104) is converted in the most upstream part of the riser reactor (106) to generate hydrogen. After about 0.1 seconds of residence time of the hydrocarbon co-feed (104) in the riser reactor (106), a feed of a solid biomass material (110) is introduced into the riser reactor (106). In the riser reactor (106) the solid biomass material (110) and the hydrocarbon co-feed (104) are catalytically cracked to produce one or more cracked products. The mixture (112) of one or more cracked products, catalytic cracking catalyst, steam, and any residual non-cracked solid biomass material and hydrocarbon co-feed is forwarded from the top of the riser reactor (106) into a reactor vessel (114), comprising a first cyclone separator (116) closely coupled with a second cyclone separator (118). Cracked products (120) are retrieved via the top of the second cyclone separator (118) and optionally forwarded to a fractionator (not shown). Spent catalytic cracking catalyst (122) is retrieved from the bottom of the cyclone separators (116 and 118) and forwarded to a stripper (124) where further cracked products are stripped off the spent catalytic cracking catalyst (122).

The spent and stripped catalytic cracking catalyst (126) is forwarded to a regenerator (128), where the spent catalytic cracking catalyst is contacted with air (130) to produce a hot regenerated catalytic cracking catalyst (108) that can be recycled to the bottom of the riser reactor (106).

Figure 2A:
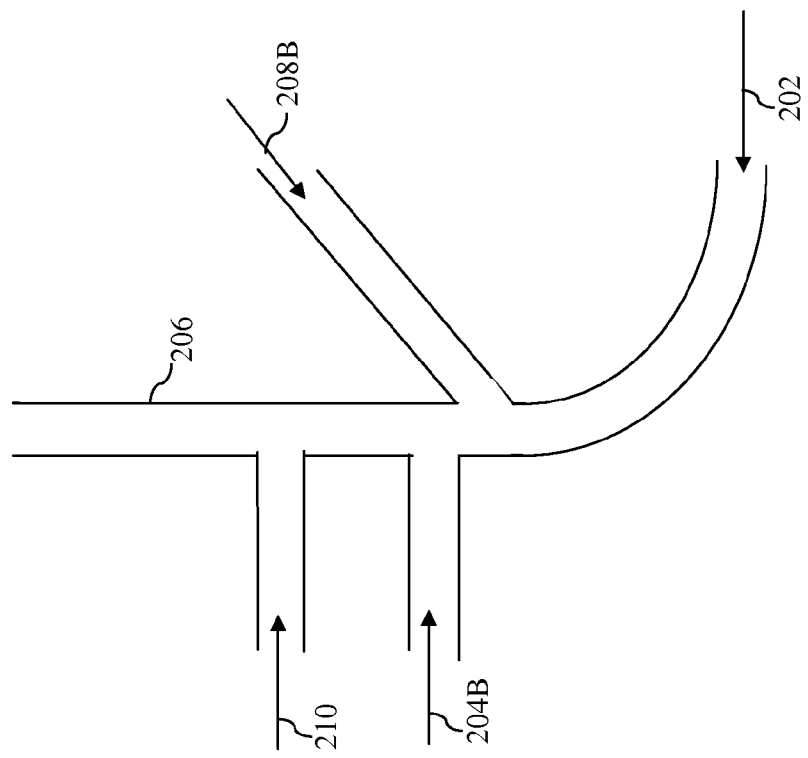
FIG. 2A shows a schematic diagram of specific embodiment A for the process of FIG. 1.
Figure 2B:
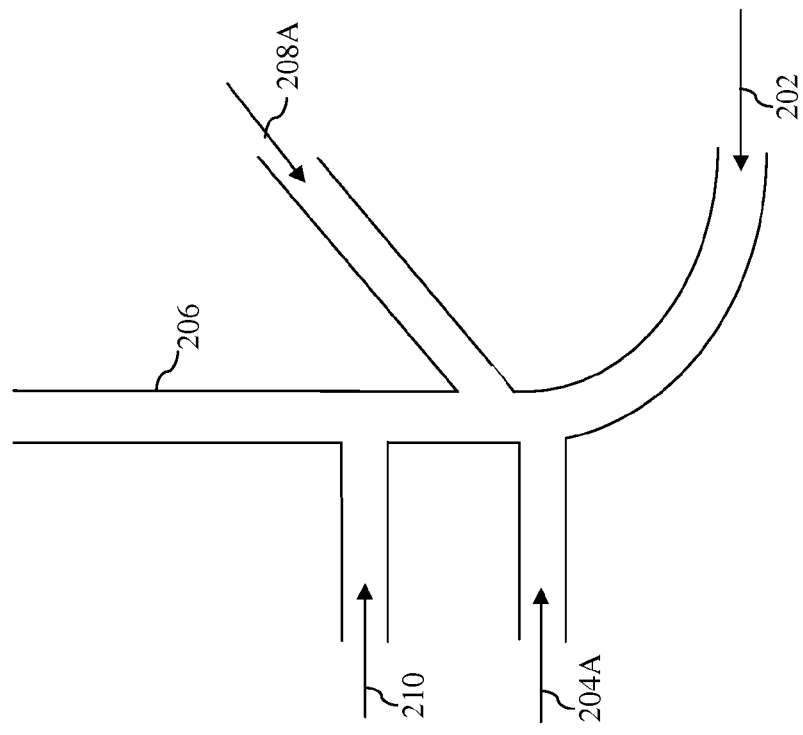
FIG. 2B shows a schematic diagram of specific embodiment B for the process of FIG. 1.

FIGS. 2A and 2B show schematic diagrams of respectively specific embodiment A and specific embodiment B for the process of FIG. 1, where everything is as in the process as illustrated by FIG. 1, except that for FIG. 2B the hydrocarbon co-feed is introduced to the riser reactor at a location downstream of the location where the catalytic cracking catalyst has been introduced to the riser reactor.

Hence, FIG. 2A shows a riser reactor (206), where a liftgas consisting of steam (202) is introduced most upstream, whereafter subsequently a hydrocarbon co-feed (204A), a hot regenerated catalytic cracking catalyst (208A), and a solid biomass material (210) are introduced to the riser reactor (206).

FIG. 2B shows a riser reactor (206), where a liftgas consisting of steam (202) is introduced most upstream, whereafter subsequently a hot regenerated catalytic cracking catalyst (208B), a hydrocarbon co-feed (204B) and a solid biomass material (210) are introduced to the riser reactor (206).

Figure 3:
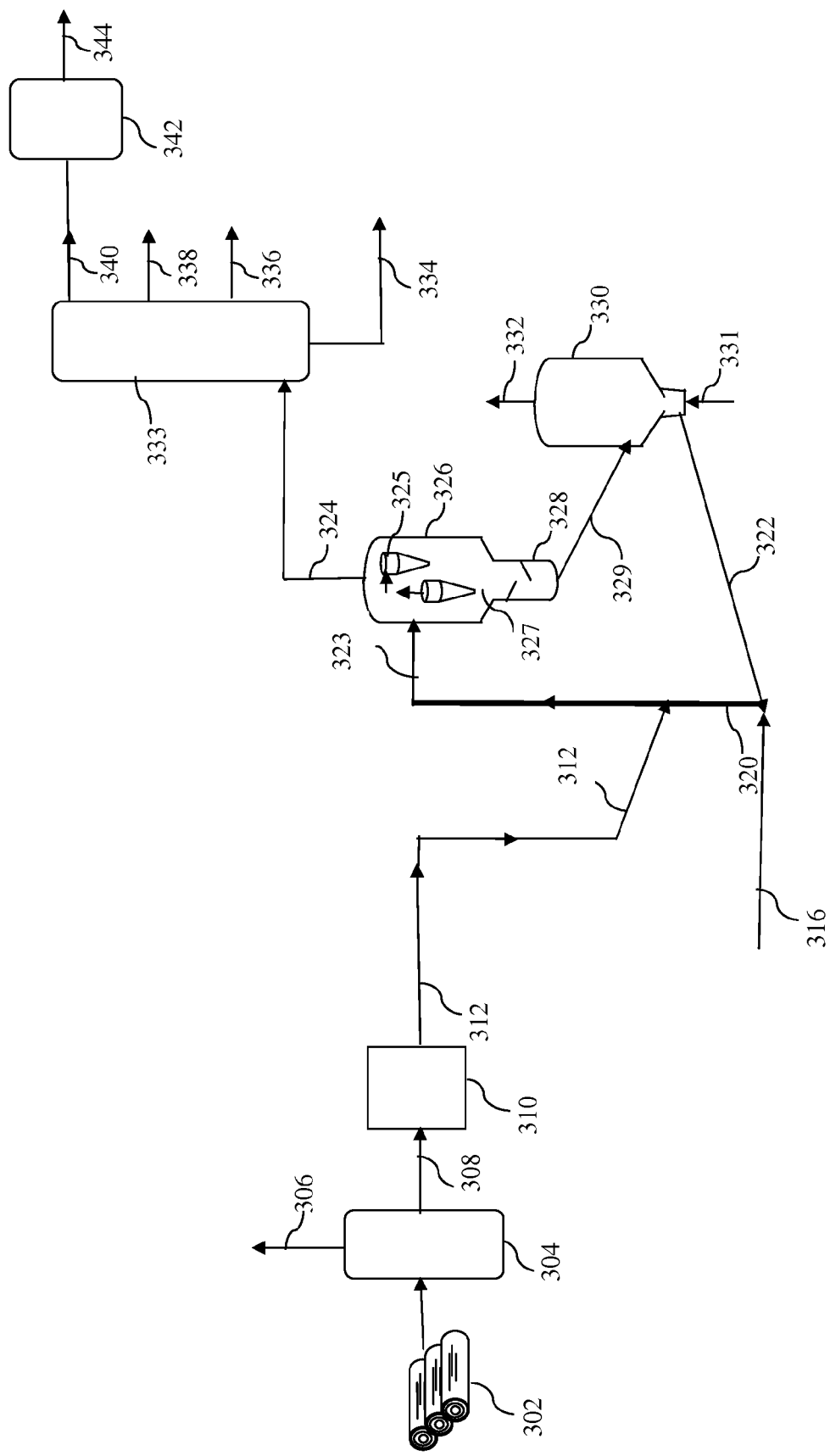
FIG. 3 shows a schematic diagram of another embodiment of the process according to the invention.

In FIG. 3 another embodiment according to the invention is illustrated. In FIG. 3, wood parts (302) are fed into a torrefaction unit (304), wherein the wood is torrefied to produce torrefied wood (308) and gaseous products (306) are obtained from the top. The torrefied wood (308) is forwarded to a micronizer (310), wherein the torrefied wood is micronized into micronized torrefied wood (312). The micronized torrefied wood (312) is fed as a side-stream into an enlarged bottom section of a fluidized catalytic cracking (FCC) riser reactor (320). In addition, a long residue (316) is fed to the FCC riser reactor (320) at a position located upstream of the entry of the micronized torrefied wood (312), in this case at the bottom of the FCC riser reactor (320). In the FCC riser reactor (320) the long residue (316) is contacted with regenerated catalytic cracking catalyst (322) thus generating hydrogen. The long residue (316), generated hydrogen, and catalytic cracking catalyst (322) are subsequently contacted with the micronized torrefied wood (312) at a catalytic cracking temperature. In the FCC riser reactor (320) cracked products (324) are formed. A mixture (323) comprising spent catalytic cracking catalyst and produced cracked products is forwarded to a vessel (326) and separated in one or more cyclone separators (325) located in vessel (326). The separated spent catalytic cracking catalyst (327) is subsequently stripped in stripper (328) providing a stripped spent catalytic cracking catalyst (329). The stripped and spent catalytic cracking catalyst (329) is forwarded to a regenerator (330), where it is regenerated with an oxygen containing gas (331) that is provided to the regenerator to produce carbon dioxide (332) and a regenerated catalytic cracking catalyst (322). The regenerated catalytic cracking catalyst is recycled to the bottom of the FCC riser reactor (320) as part of the regenerated catalytic cracking catalyst (322). The separated cracked products (324) are forwarded to a fractionator (333). In the fractionator (333) the cracked products (324) are fractionated into several product fractions, such as for example a slurry oil containing fraction (334), a heavy cycle oil containing fraction (336), a light cycle oil containing fraction (338) and a naphtha containing fraction (340). The naphtha containing fraction (340) may contain gasoline and is also referred to as gasoline containing fraction. The naphtha containing fraction (340) is forwarded to a hydrodeoxygenation reactor (342) where it is hydrodeoxygenated over a sulphided Nickel-Molybdenum on alumina catalyst to produce a hydrodeoxygenated product (344). The hydrodeoxygenated product can be blended with one or more additives to produce a biofuel suitable for use in automotive engines.

What is claimed is:

1. A process for converting a solid biomass material comprising: contacting, in a riser reactor, the solid biomass material and a hydrocarbon co-feed with a catalytic cracking catalyst at a temperature of more than 400° C. to produce one or more cracked products, said solid biomass material is introduced to the riser reactor at a location downstream of the location where the hydrocarbon co-feed is introduced to the riser reactor, wherein the hydrocarbon co-feed is contacted with the catalytic cracking catalyst first before the introduction of the solid biomass material.

2. The process of claim 1 wherein the solid biomass material and the hydrocarbon co-feed is contacted with the catalytic cracking catalyst in the presence of a liftgas at a temperature of more than 400° C., said liftgas is introduced to the riser reactor at a location upstream of the location where the hydrocarbon co-feed is introduced to the riser reactor.

3. The process of claim 2 wherein the liftgas does not contain vaporized oil and/or vaporized oil fractions.

4. The process of claim 3 wherein the vaporized oil fraction is selected from the group consisting of vaporized liquefied petroleum gas, vaporized gasoline, vaporized diesel, vaporized kerosene and vaporized naphtha.

5. The process of claim 1 wherein the hydrocarbon co-feed comprises straight run (atmospheric) gas oils, flashed distillate, vacuum gas oils (VGO), coker gas oils, gasoline, naphtha, diesel, kerosene, atmospheric residue ("long residue") and vacuum residue ("short residue") and/or mixtures thereof.

6. The process of claim 1 wherein equal to or more than 60 wt % of the hydrocarbon co-feed is introduced into the riser reactor in the liquid state.

7. The process of claim 1 wherein the catalytic cracking catalyst is introduced into the riser reactor at a location downstream of the location where the hydrocarbon co-feed is introduced.

8. The process of claim 1 wherein the catalytic cracking catalyst is introduced into the riser reactor at a location upstream of the location where the hydrocarbon co-feed is introduced.

9. The process of claim 1 wherein the catalytic cracking catalyst contains one or more hydrogenation metal(s).

10. The process of claim 1 wherein the riser reactor comprises a riser reactor pipe having a diameter that increases in a downstream direction.

11. The process of claim 1 wherein the riser reactor is a riser reactor comprising a bottom section and a riser reactor pipe, where the most downstream part of the bottom section has an inner diameter that is larger than the inner diameter of the most upstream part of the riser reactor pipe.

12. The process of claim 1 wherein the one or more cracked products is subsequently fractionated to produce one or more product fractions.

13. The process of claim 12 wherein the one or more product fractions obtained by fractionation are subsequently hydrodeoxygenated to obtain one or more hydrodeoxygenated products.

14. The process of claim 12 wherein the one or more product fractions are blended with one or more other components to prepare a biofuel and/or a biochemical.

15. The process of 13 wherein the one or more hydrodeoxygenated product fractions are blended with one or more other components to prepare a biofuel and/or a biochemical.

16. The process of claim 1 wherein the weight ratio of catalyst to solid biomass material is in the range from equal to more than 1:1 to equal to or less than 150:1.

17. The process of claim 16 wherein the weight ratio of catalyst to the hydrocarbon co-feed is in the range from equal to or more than 1:1 to equal to or less than 150:1.

18. The process of claim 1 wherein the catalytic cracking catalyst is a fluidized catalytic cracking catalyst.

19. The process of claim 1 wherein the contacting in the riser reactor is carried out at a temperature in the range from at least 450° C. to equal to at most 800° C.

20. The process of claim 19 wherein the temperature at the location where the hydrocarbon co-feed is introduced into the riser reactor is higher than the temperature at the location where the solid biomass material is introduced into the riser reactor.

21. The process of claim 1 wherein the hydrocarbon co-feed had a residence time of from equal to or more than 0.01 seconds before solid biomass material is introduced.

* * * * *